United States Patent [19]

Koerner

[11] Patent Number: 4,742,244
[45] Date of Patent: May 3, 1988

[54] ELECTRONIC FLOAT SWITCH APPARATUS

[75] Inventor: Charles B. Koerner, Port Murray, N.J.

[73] Assignee: ITT Avionics, Nutley, N.J.

[21] Appl. No.: 919,108

[22] Filed: Oct. 15, 1986

[51] Int. Cl.$^4$ .............................................. H01H 35/18
[52] U.S. Cl. ...................................... 307/118; 307/117; 340/620; 324/61 R; 73/304 R
[58] Field of Search ............... 307/38, 116, 117, 118; 340/618, 620, 870.38; 324/61 R; 73/304 R, 304 C; 137/78.2, 78.3, 392, 393, 399; 239/63, 70; 367/908

[56] References Cited

U.S. PATENT DOCUMENTS

| | | | |
|---|---|---|---|
| 4,001,676 | 1/1977 | Hile et al. | 73/304 C X |
| 4,053,874 | 10/1977 | Glaser | 307/118 X |
| 4,171,932 | 10/1979 | Miller | 307/118 X |
| 4,196,625 | 4/1980 | Kern | 73/304 R |
| 4,244,385 | 1/1981 | Hotline | 307/118 X |
| 4,265,262 | 5/1981 | Hotline | 307/118 X |
| 4,371,790 | 2/1983 | Manning et al. | 307/118 |
| 4,380,091 | 4/1983 | Lively | 137/392 X |
| 4,382,382 | 5/1983 | Wang | 340/620 X |
| 4,392,782 | 7/1983 | Kuehn et al. | 307/118 X |
| 4,404,809 | 9/1983 | Johnson et al. | 137/392 X |
| 4,423,417 | 12/1983 | Tanaka et al. | 324/61 R X |
| 4,444,545 | 4/1984 | Sanders et al. | 307/118 X |
| 4,530,372 | 7/1985 | Overton et al. | 307/118 X |
| 4,551,068 | 11/1985 | Boudreaux | 137/392 X |
| 4,562,858 | 1/1986 | Salina et al. | 307/118 X |
| 4,586,033 | 4/1986 | Andrejasich | 340/620 X |
| 4,600,844 | 7/1986 | Atkins | 307/118 |

Primary Examiner—William M. Shoop, Jr.
Assistant Examiner—Paul Ip
Attorney, Agent, or Firm—Robert A. Walsh; Thomas N. Twomey; Mary C. Werner

[57] ABSTRACT

There is disclosed an electronic float switch circuit which employs simple immersion probes, one of which is associated with a high fluid level and the other with a low fluid level. Each of the immersion probes operates in conjunction with an oscillator, a detector and a comparator. Essentially, when the associated immersion probe is immersed in a fluid, the oscillator ceases oscillations which therefore provides a first low voltage level via the detector to the comparator to therefore change the state of the comparator. The comparator associated with the high and low level probes operate to set and reset a DC flip-flop which in turn controls an opto-isolator device to trigger a triac. The triac operates the pump. When the fluid level reaches below the level of the low probe, the circuit is disabled allowing the vessel again to be filled with water to allow the pump to operate between the high and low levels by means of the electronic circuit.

5 Claims, 1 Drawing Sheet

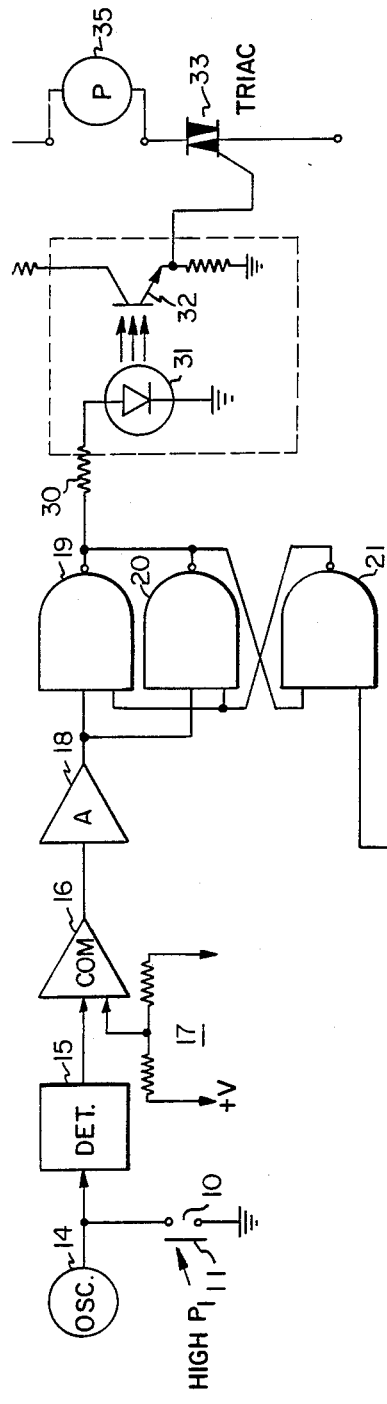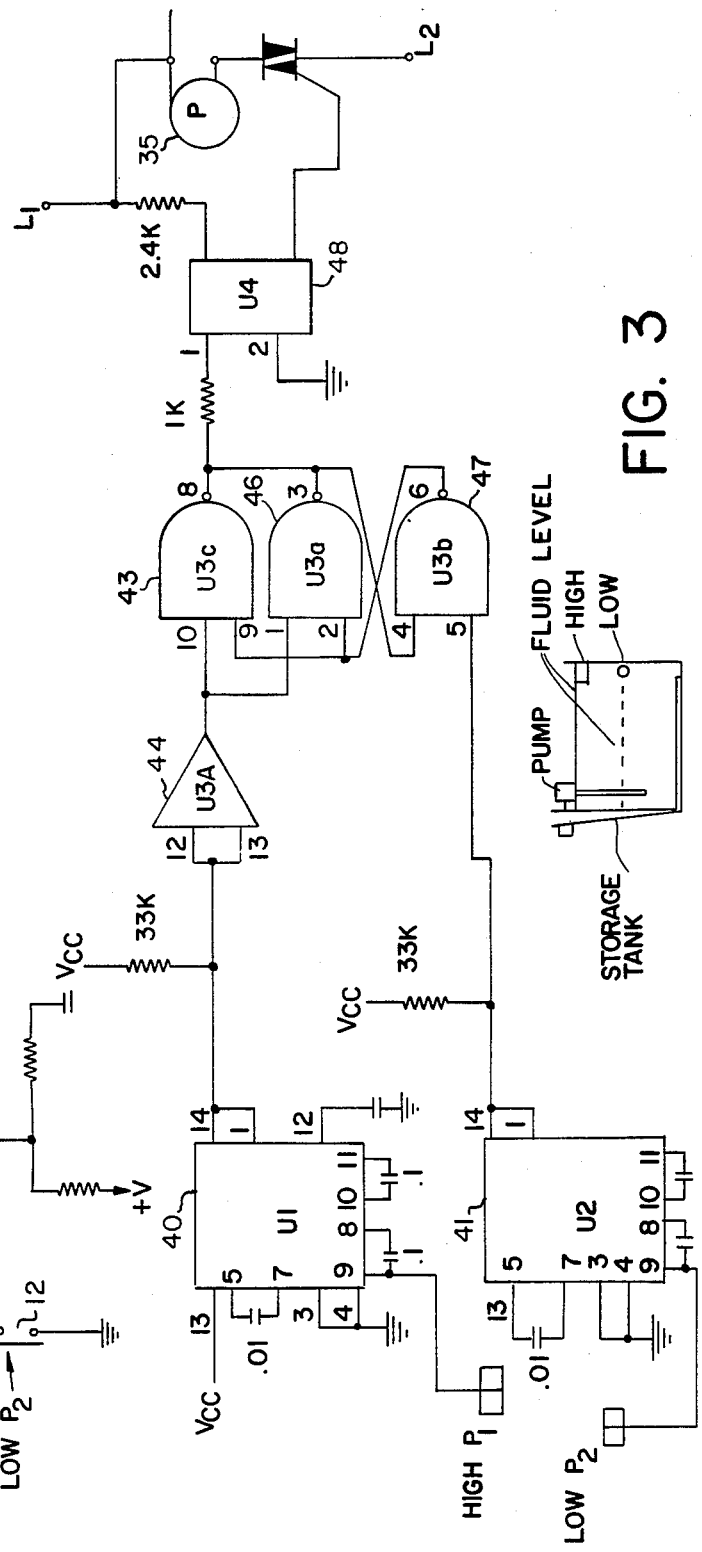
FIG. 1
FIG. 2
FIG. 3

ELECTRONIC FLOAT SWITCH APPARATUS

BACKGROUND OF THE INVENTION

This invention relates to float switches in general and more particularly to an electronic float switch.

As one can ascertain, the prior art is replete with devices which essentially operate to monitor the fluid levels in a tank or other storage vessel. Many devices essentially operate by means of an electromechanic switch which is activated by a float. The float rides on the surface of the liquid, and when the liquid recedes to a given value, the switch is operated. These type of devices are subject to sticking in either the On or Off position. Most of the devices are operated so that they control a pump or other means for controlling the level in the storage tank or vessel.

In any event, if such a switch sticks in the closed position, it will cause the pump to continue to operate which essentially will cause the pump to burn out. If the electromechanical switch sticks in the open position, this can cause a flooding or overflow because the pump would not operate. Such system failures are well known and occur in many instances due to the electromechanical devices presently utilized in such systems.

It is, therefore, an object of the present invention to provide an improved switching means which will enable one to electronically monitor the upper and lower levels of a typical storage tank to allow the pump to be activated while avoiding the problems associated with the prior art mechanical devices.

BRIEF DESCRIPION OF THE PREFERRED EMBODIMENT

An electronic float switch for monitoring a high and low fluid volume in a vessel or storage tank comprising a high level probe positioned at a given level in said tank and operative to provide a low impedance when immersed in said fluid, first means responsive to said low impedance of said high level probe to provide a first output level when said probe is immersed and a second output level when said probe is not immersed, a low level probe positioned at a lower level in said tank and operative to provide a low impedance when immersed in said fluid, second means responsive to said low impedance of said low level probe to provide a first output level when said low level probe is immersed and a second output level when said probe is not immersed, circuit means coupled to said first and second means and operative to provide a fixed output level when said first output levels are present from both probes and to maintain said level when said first level is provided by said second probe and to provide a second fixed level when both probes provide said second output level, control means coupled to a pump motor for activating said motor during said first fixed level output of said circuit means and to deactivate said pump motor during said second output level.

BRIEF DESCRIPTION OF THE FIGURES

FIG. 1 is a detailed schematic diagram showing an electronic float switch according to this invention.

FIG. 2 is a schematic diagram showing the electronic float switch implemented by conventional commercially available integrated circuits.

FIG. 3 is a simple diagram showing a storage tank and a pump of the type controlled according to this invention.

DETAILED DESCRIPTION OF THE INVENTION

Referring to FIG. 1, there is shown a first probe designated as P1 and also indicated by reference numeral 10. The probe P1, as will be explained, can be a simple single wire immersion probe. Essentially, such a probe exhibits a low impedance when inserted in a fluid. When the probe is removed from the fluid, the impedance becomes higher. Many examples of such immersion probes are well known and such devices are extremely reliable and relatively inexpensive.

The probe P1 for example would be emplaced in a storage tank or other vessel containing a fluid such as water or any type of other conductive fluid. The probe P1 would be positioned at a particular level designating a high fluid level in the vessel. Also shown in FIG. 1 is an identical probe P2. The probe P2 would be positioned at the low fluid level in a particular tank. Hence depending on the size of the tank, the distance between the probes may be a few feet or more or a few inches depending on the water level to be monitored.

As seen from FIG. 1, there is a first oscillator 14 associated with the probe 10. The output of the oscillator is applied to a detector circuit 15. The detector circuit is a typical detector which may include a diode and capacitor to produce a DC voltage according to the magnitude or amplitude of the oscillator. Oscillator 14 may be any type of simple and inexpensive oscillator such as an astable multivibrator, and the frequecy of operation of the oscillator is not important. The output of the detector 15 is supplied to a comparator chip 16 whereby a reference voltage supplied to the comparator via the resistive divider 17 keeps the comparator output at a given value if the output from the detector compares with the reference voltage. The output of the comparator is coupled to an amplifier 18 where the signal is essentially amplified and inverted. One input to the amplifier 18 goes to a first NAND gate 19 which is configured in conjunction with gates 20 and 21 into a flip-flop. The other input to the flip-flop is derived from the low level probe 12. The low level probe 12 is also associated with an oscillator 25, detector 26 and a comparator 27, all of identical configuration to the above-described components.

In this instance, the output from comparator 27 is applied directly to one input of NAND gate 21 forming part of a conventional flip-flop. The output of the flip-flop is directed via a resistor 30 to a LED device 31. Hence when the flip-flop is in a binary one state, the LED device illuminates and controls the base junction of a phototransistor 32. When the transistor 32 receives light from the LED device 31, it is activated which is turn supplies a trigger voltage to a triac 33. The triac 33 has as its load the pump 35. Hence as one can ascertain from FIG. 1, when the flip-flop consisting of gates 19, 20 and 21 is operated, this causes the LED device 31 to illuminate which in turn causes the pump to turn on. If the flip-flop is deactivated, the pump will turn off. The operation of the circuit will now be explained in greater detail.

As indicated, the probe 10 designates a high fluid level in a tank and is appropriately installed in the tank while the probe 12 designates a low fluid level in the tank and is appropriately installed in the tank. It is immediately seen that a first condition of operation, both the high probe 10 and the low probe 12 would be activated due to the fact that both would be immersed in a fluid. By activating both probes, it essentially means closure of the probe or that the probe provides a low impedance with respect to ground or with respect to a reference potential.

As seen from FIG. 1, both oscillators 14 and 25 would be loaded by the low impedance of the associated probe when immersed. Hence the oscillators would not produce a large output. Therefore, during this condition, the detectors 15 and 26 would provide a low DC voltage and the comparator 16 provides a low output due to the fact that the low DC voltage would not be of a sufficient magnitude as compared to the reference level. During this condition where both probes are inserted in the fluid, the output from comparator 16 via ammplifier 18 is inverted, while the output from comparator 27 is non-inverted and is applied directly to NAND gate 21 associated with the NAND gate flip-flop. In this manner, the flip-flop will be activated and the output of the flip-flop would be at a high state. This in turn causes the LED device 31 to operate thereby triggering the triac 33 which in turn operates the pump. As soon as the pump begins to operate, the water level in the tank decreases. Thus the first thing that occurs is that the probe 10 which is the high level probe is no longer immersed in the fluid and hence its impedance increases allowing oscillator 14 to again operate thereby providing a suitable voltage from the detector 15 to activate comparator 16.

In any event, the flip-flop which is the gate flip-flop does not reset when the comparator 16 is providing a high output. The flip-flop is kept operated by means of comparator 27 and gate 21 associated with the low level probe 12. As soon as enough fluid is pumped out of the tank indicative of the low level, the probe P2 will also go to its high impedance state. It is, of course, understood that at this point in time, both probes 10 and 12 are in their high impedance state. Thus oscillator 25 oscillates to activate detector 26 and comparator 27 to the low state condition. Comparator 27 now reverses polarity which in turn resets the flip-flop consisting of gates 19, 20 and 21. This turns off the LED 31 which turns off transistor 32 and the triac 33, thus ceasing pump operation.

As soon as the tank is refilled, the low probe again is immersed in water but ceasing of oscillations by oscillator 25 and the resultant output of comparator 27 will not trigger the flip-flop via gate 21. When the water level again reaches the high probe then oscillator 14 ceases oscillation causing comparator 16 via the inverting amplifier 18 to again trigger the flip-flop allowing the above-described sequence to continue again. Hence it is noted that when both the high and low probes are immersed in water, the flip-flop can be triggered. Similarly, when both the high and low probes are out of the fluid, the flip-flop is turned off.

During all other operations, the flip-flop is again activated to keep the pump operating between the high and low levels for all conditions.

Referring to FIG. 2, there is shown a implementation of the above-noted circuit utilizing commercially available integrated circuits. The circuit designated by reference numeral 40 and 41 designated as U1 and U2 is a conventional integrated circuit sold as an oscillator, balanced detector circuit and available from many manufacturers such as the Sprague Company and sold under the nomenclature ULN 2429. The inverting amplifier 44 as well as gates 45, 46 and 47 which comprise the DC flip-flop are available by means of an integrated circuit chip also sold and distribued by many manufacturers designated as the 74 C 00. The LED and phototransistor device shown in dashed lines in FIG. 1 is a conventional module sold as the MOC 3031. The triac employed is a 2N 6162 triac also available from many manufacturers. The terminals L1 and L2 can be coupled to a suitable AC supply or to a positive and negative supply depending on the particular windings associated with the pump motor 35.

Thus as one can ascertain, the circuit requires four conventional integrated circuit units and a commercially available tiac. The circuits 40 and 41 monitor the high and low fluid levels respectively via simple single wire immersion probes as P1 and P2. When the liquid touches probe P1, U1 or module 40 conducts and sets flip-flop consisting of gates 43, 46 and 47. U3 or module 41 in turn conducts when the fluid level reaches a low value and resets the above-noted flip-flop. The flip-flop in turn activates the opto-isolator module 48 which in tur activates the triac. When the triac conducts, the pump connected to the load terminals begins to empty liquid from the holding tank. When the liquid level reaches that of the low level probe, the module 41 conducts which in turn resets the flip-flop thus turning off the triac and the pump.

It is, of course, understood that the circuit has wide spread application which includes automatic sewage, holding tank controls or any application where fluid is held or stored until a certain volume is attained before the pumping out operation commences.

Referring to FIG. 3, there is shown a typical storage tank which contains a typical fluid. There is shown a pump immersed in the fluid and there is shown the positioning of the high level and low level probes. Essentially, as one can ascertain, the pump which is operated by the above-described circuits will pump water out until the low level is reached. At this point, the low level probe is no longer immersed in water and the flip-flop is reset thereby turning off the pump. The storage tank is then filled by separate means, and once the high level position is reached, the flip-flop will be triggered on again thus turning on the pump and allowing the fluid to be pumped out of the storage tank.

This is given by way of example, and as one can ascertain, there are many other embodiments in which the above-described electronic float switch can be employed.

What is claimed is:

1. An electronic float switch for monitoring a high and low fluid volume in a vessel or storage tank comprising:

a high level probe positioned at a given level in said tank indicative of a high fluid volume and operative to provide a first low impedance when immersed in said fluid, first means responsive to said first low impedance of said high level probe to provide a first output level when said probe is immersed and a second output level when said probe is not immersed, said first means including a first oscillator capable of providing a first given frequency at an output, with the output of said first oscillator coupled to said high level probe to cause the amplitude of oscillations to decrease when said high level probe is immersed in said fluid, with the output of said first oscillator further coupled to the input of a first detector for providing a first detected voltage according to the level of oscillations, and having an output coupled to one input of a first comparator for comparing said first detected voltage with a first reference voltage to provide at an output of said first comparator said first output level when said high level probe is immersed and said second output level when said high level probe is not immersed, a low level probe positioned at a lower level in said tank indicative of a low fluid volume and operative to provide a second low impedance when immersed in said fluid, second means responsive to said second low impedance of said low level probe to provide a third output level when said low level probe is immersed and a fourth output level when said low level probe is not immersed, said second means including a second oscillator capable of providing a second given frequency at an output, with the output of said second oscillator coupled to said low level probe to cause said amplitude of oscillations to decrease when said low level probe is immersed in said fluid, when the output of said second oscillator further coupled to the input of a second detector for providing a second detected voltage according to the level of oscillations, and having an output coupled to one input of a second comparator for comparing said second detected voltage with a second reference voltage to provide at an output of said second comparator said first output level when said low level probe is immersed and said second output level when said low level probe is not immersed, circuit means coupled to said first and second means and operative to provide a first fixed output level when said first and third output levels are present from both probes and to maintain said level when said third level is provided by said second probe and to provide a second fixed output level when both probes provide said second and fourth output levels, and control means coupled to a pump motor for activating said motor during said first fixed output level of said circuit means and to deactivate said pump motor during said second fixed output level.

2. An electronic float swich according to claim 1, wherein said high and low level probes are immersion probes.

3. An electronic float switch according to claim 1, wherein said second means is a flip-flop having one input coupled to said first comparator output of said first means and another input of said second means to enable said flip-flop to be set when both probes are immersed and to be reset when both probes are not immersed.

4. An electronic float switch according to claim 3, wherein said flip-flop is a NAND gate flip-flop including a first NAND gate having a first input coupled to the output of an inverter with the input of said inverter couple to the output of said first comparator associated with said first means, and said first gate having a second input and an output, a second NAND gate having one input coupled to the first input of said first gate and a second input coupled to the second input of said first gate and having an output coupled to the output of said first gate, a third NAND gate having a first input coupled to the output of said second gate and an output coupled to the input of said second gate and having a second input coupled to the output of said second comparator associated with said second means.

5. An electronic float switch according to claim 4, wherein said control means includes a light emitting diode coupled to the output of said first gate and optically coupled to the base of a phototransistor with an output terminal of said phototransistor coupled to the gate of a triac having its output terminals coupled to a pump motor for operating said motor during said first fixed level.

* * * * *